Dec. 17, 1946.        J. E. COTTON        2,412,717
ELECTRODE HOLDER
Original Filed Oct. 10, 1944
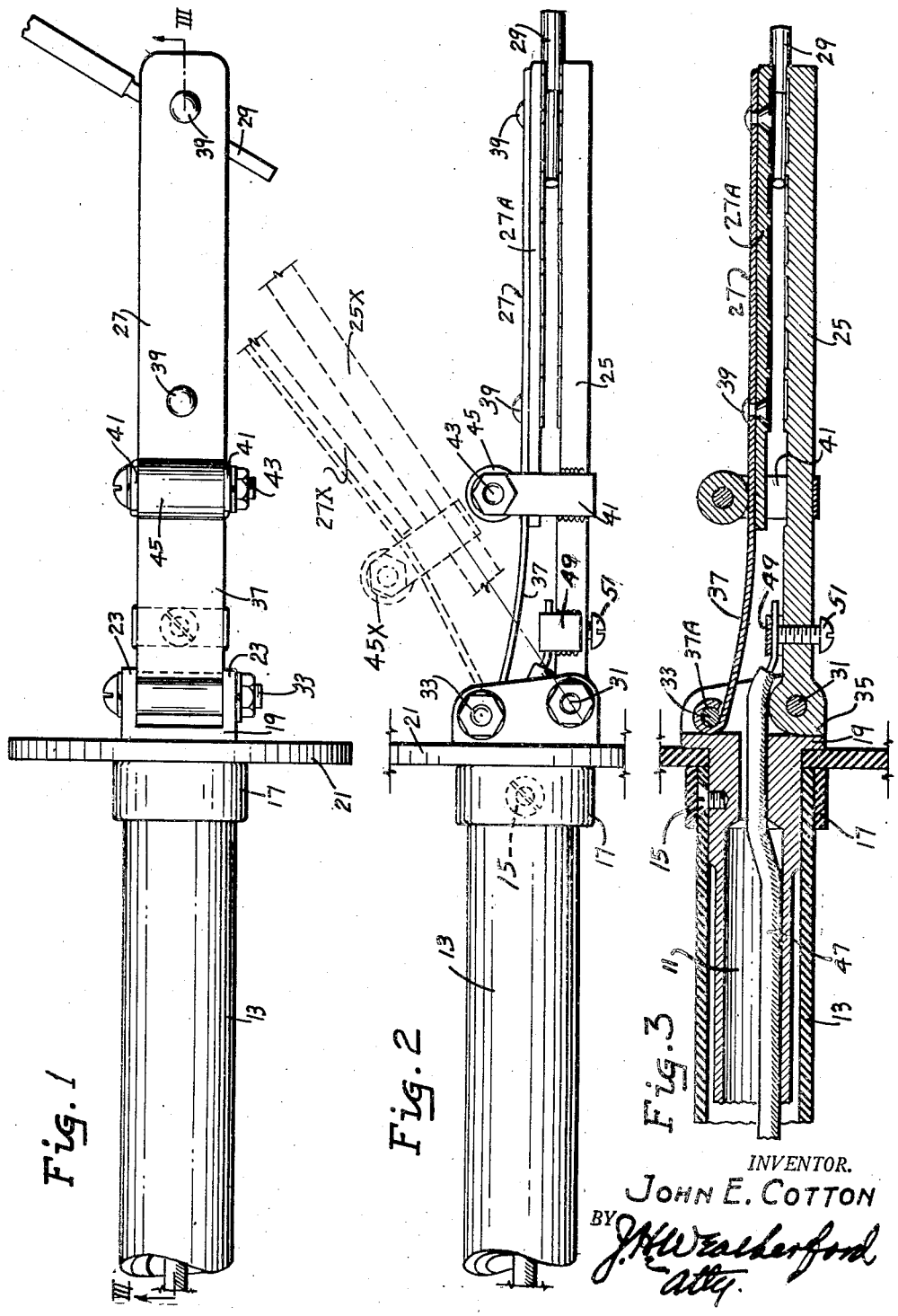
INVENTOR.
JOHN E. COTTON
BY Patented Dec. 17, 1946

2,412,717

UNITED STATES PATENT OFFICE 2,412,717

ELECTRODE HOLDER

John E. Cotton, Batesville, Miss.

Substitute for abandoned application Serial No. 557,977, October 10, 1944. This application September 12, 1945, Serial No. 615,797

4 Claims. (Cl. 219—8)

1

This invention relates to holders for welding rods of that type in which the rod serves as an electrode through which current is passed in establishing a welding arc.

It particularly relates to an electrode holder through which the rod may be readily clamped and held at any desired angle to the holder and may be as readily released, as when it is largely used up and it is desired to discard an unused stub and replace it with an additional rod.

The objects of the invention are:

To provide a holder which is simple in construction and may be readily manipulated to firmly grip the electrode and establish a current lead thereto and therethrough during welding operations and be as readily released;

To provide such a holder which will effect the gripping of the electrode with a minimum of effort, and which when it has gripped the electrode will position it in parallelism with a plane through the axis of the handle even though at an angle, as is usual, in such plane to the axis.

The means by which the foregoing and other objects are accomplished, and the method of their accomplishment, will readily be understood from the following specification upon reference to the accompanying drawing, in which:

Fig. 1 is a side elevation of the holder showing a fragmentary portion of an electrode secured between the jaws thereof.

Fig. 2 is a plan of the holder; and

Fig. 3 a longitudinal section taken as on the line III—III of Fig. 1.

Referring now to the drawing in which the various parts are indicated by numerals:

11 is a handle around which is an insulating sleeve 13 which is preferably secured to the handle as by a screw 15 which may be covered by an additional insulating ring 17, usually of soft rubber. Adjacent one end of the handle is formed a shoulder 19.

21 is a hand guard or shield which slips over the handle 11 and is held in place against the shoulder 19 by the insulation 13. Extending from the enlarged portion 19 of the handle are side flanges 23, spaced apart to snugly receive therebetween jaws 25 and 27 which are adapted when closed to clamp against the electrode 29 and hold the electrode firmly therebetween.

The jaws 25 and 27 are hingedly secured to the flanges 23, as by pivot pins 31, 33, respectively, these preferably being bolts which may be readily removed should it be desired to change the jaws for any reason and as readily replaced when the jaws are replaced or new ones substituted.

2

It will be noted that the bolt 33 which secures the jaw 27 is somewhat closer to the shoulder 19 than is the bolt 31, effecting an increase in relative longitudinal movement of the jaws and slower closing as final clamping occurs.

The jaw 25 is provided with a shoulder 35 which seats against the shoulder 19 and limits movement of the jaw about the bolt 31, this shoulder being so proportioned that the jaw 25 will extend parallel to the axis of the handle when the jaws are clamped.

The jaw 27 comprises a resilient member 37, preferably a flat strip of spring steel to which an underlying block 27A of equal width is secured, as by rivets 39, the block 27A stiffening the clamping portion of the jaw. An eye 37A is formed at the inner end of the resilient member to cooperate with the pivot pin 33 and form the hinge for the upper jaw. The member 37 is preferably bowed downward between the hinge and clamp portions of the jaw.

Ears 41, preferably parts of a U member, are rigidly secured as by welding on opposite sides of the jaw 25 and extend beyond the jaw 27. These jaws carry a pin 43, preferably a bolt, which journals a roller 45. The roller 45 contacts the member 37 and rolls therealong to effect clamping cooperation of the jaw 27 with the jaw 25, or may be shifted reversely to allow their release, as the case may be.

Current is fed to the holder from a suitable source (not shown) through the usual feed wire 47, which is clamped to the jaw 25 as by a clip 49 and screw 51. It will be noted here that the feed wire is directly coupled to the jaw and that the handle 11 need not be of metal since no current is carried therethrough. It will be understood, therefore, that the handle may be of dielectric material, as Bakelite, and be used without the insulating sleeve 13 which is necessary if the handle be metal, and that in either event the handle is dielectric.

In use, the jaw portions 25, 27 of the device are broken relatively to the handle portion 11, about the hinge centers 31 and 33, as to the dotted positions 25X, 27X, the roller shifting toward the center 33 to the position 45X and allowing separation of the jaws to receive the electrode. With the electrode 29 between the jaws they are forcibly returned to the position shown in Figs. 2 and 3, the roller moving along the member 37 and effecting the clamping. In this clamping action the jaws approach more and more slowly as clamping is effected, gripping force being limited by the bending strength of the resilient member 37. Closing movement also effects a relative longitudinal movement of the jaws which effects a rolling movement of the electrode if it be transverse to the jaws, or a drawing action therealong if it be alined with the jaws, in either case insuring electrical contact of the jaws with the electrode.

This application is a substitute for application Serial No. 557,977, filed October 10, 1944, by the same inventor, and now abandoned.

I claim:

1. An electrode holder including an insulating handle, metal jaws spaced apart at, and independently hinged to, one end of said handle and extending longitudinally therefrom, and means establishing a circuit lead to one of said jaws, a first said jaw having rigidly secured thereto intermediate its length a member embracing the second said jaw, said member including a roller contacting the remote side of said second jaw, said second jaw including a resilient section and a continuing rigid jaw portion and converging from its hinge end toward said first jaw and curving into parallelism therewith at said member, whereby separation of said jaws and release of said electrode may be accomplished by deflection of said jaws.

2. An electrode holder including an insulating handle, flat, metal jaws spaced apart at, and independently hinged to, one end of said handle and extending longitudinally therefrom, and means establishing a circuit lead to one of said jaws, a first said jaw having rigidly secured thereto intermediate its length a member embracing, and contacting the remote side of said second jaw, said second jaw including a resilient section and a continuing rigid portion, and converging from its hinge end toward said first jaw and curving toward parallelism therewith at said member, whereby separation of said jaws and release of said electrode may be accomplished by deflection of said jaws.

3. An electrode holder including an insulating handle, flat metal jaws spaced apart at, and independently hinged to, one end of said handle and extending longitudinally therefrom, and means establishing a circuit lead to one of said jaws, a first said jaw having rigidly secured intermediate its length a member embracing, and contacting the remote side of said second jaw; said second jaw including a resilient section and a continuing rigid portion, converging from its hinge end toward said first jaw and curving toward parallelism therewith at said member, whereby separation of said jaws may be accomplished by deflection of said jaws, said first jaw having at its hinge end a shoulder cooperating with an end portion of said handle to limit return movement about its said hinge.

4. An electrode holder, which comprises an insulating handle having a pair of spaced flanges extending from one end thereof, pins carried by said flanges and laterally spaced apart, a pair of substantially flat, metal jaws, each having an end portion disposed between said flanges and respectively hinged on said pins, a first of said jaws having rigidly secured thereto a member embracing and contacting the remote side of said first jaw, the other of said jaws converging from said hinge pin toward said first jaw and curving into parallelism therewith at said member, whereby separation of said jaws may be accomplished by deflection thereof and shift of said member, and a circuit lead secured in electrical contact with said jaws.

JOHN E. COTTON.